United States Patent
Hu et al.

(10) Patent No.: US 10,365,552 B2
(45) Date of Patent: Jul. 30, 2019

(54) LIGHT SOURCE EMPLOYING A WAVELENGTH CONVERSION DEVICE WITH A LIGHT INTRODUCING DEVICE AND A LIGHT COLLECTING DEVICE

(71) Applicant: APPOTRONICS CORPORATION LIMITED, Shenzhen (CN)

(72) Inventors: Fei Hu, Shenzhen (CN); Yi Li, Pleasanton, CA (US); Yi Yang, Shenzhen (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 0 days.

(21) Appl. No.: 15/853,907

(22) Filed: Dec. 25, 2017

(65) Prior Publication Data

US 2018/0195689 A1   Jul. 12, 2018

Related U.S. Application Data

(63) Continuation of application No. 13/992,144, filed as application No. PCT/CN2011/083658 on Dec. 7, 2011, now Pat. No. 9,851,071.

(30) Foreign Application Priority Data

Dec. 8, 2010  (CN) .......................... 2010 1 0579909
Dec. 30, 2010 (CN) .......................... 2010 1 0624857

(51) Int. Cl.
*G03B 21/20* (2006.01)
*F21S 10/00* (2006.01)
(Continued)

(52) U.S. Cl.
CPC ............ *G03B 21/204* (2013.01); *F21K 9/64* (2016.08); *F21S 10/007* (2013.01); *F21V 9/08* (2013.01);
(Continued)

(58) Field of Classification Search
CPC ...... G03B 21/26; G03B 21/28; G03B 21/204; G03B 21/2066; H04N 9/3129;
(Continued)

(56) References Cited

U.S. PATENT DOCUMENTS 6,654,119 B1  11/2003  Gould et al.
7,070,300 B2   7/2006  Harbers et al.
(Continued)

FOREIGN PATENT DOCUMENTS

CN        1357104       7/2002
JP      2007-200782     8/2007
(Continued)

OTHER PUBLICATIONS

International Search Report in the parent PCT application No. PCT/CN2011/083658, dated Mar. 15, 2012.
(Continued)

*Primary Examiner* — Sultan Chowdhury
(74) *Attorney, Agent, or Firm* — Chen Yoshimura LLP

(57) ABSTRACT

A light source comprising an excitation light source for providing excitation light, and an optical wavelength conversion member disposed at a distance from the excitation light source. The optical wavelength conversion member comprises an optical wavelength conversion material for converting the excitation light into stimulated light. The light source also comprises an optical-guiding member that allows the excitation light to be incident on the optical wavelength conversion material, and an optical-collecting member for collecting converted light originating from the optical wavelength conversion material. To separate the paths of the converted light and the excitation light, the etendue of the optical-guiding member is less than or equal to ¼ of the etendue of the optical-collecting member. This allows the optical-guiding member to draw in the excitation
(Continued)

light while preventing the excessive escape of the converted light through the optical-guiding member.

20 Claims, 14 Drawing Sheets

(51) Int. Cl.

| | | |
|---|---|---|
| *G03B 21/28* | (2006.01) | |
| *G03B 21/14* | (2006.01) | |
| *F21V 9/40* | (2018.01) | |
| *F21V 9/30* | (2018.01) | |
| *F21V 13/08* | (2006.01) | |
| *F21V 9/08* | (2018.01) | |
| *G02B 26/00* | (2006.01) | |
| *G02B 19/00* | (2006.01) | |
| *F21K 9/64* | (2016.01) | |
| *H04N 9/31* | (2006.01) | |
| *F21Y 101/00* | (2016.01) | |
| *F21Y 115/10* | (2016.01) | |
| *F21Y 115/00* | (2016.01) | |
| *G02F 2/00* | (2006.01) | |

(52) U.S. Cl.
CPC .............. *F21V 9/30* (2018.02); *F21V 9/40* (2018.02); *F21V 13/08* (2013.01); *G02B 19/0028* (2013.01); *G02B 19/0047* (2013.01); *G02B 26/008* (2013.01); *G03B 21/14* (2013.01); *G03B 21/2066* (2013.01); *G03B 21/28* (2013.01); *H04N 9/315* (2013.01); *H04N 9/3114* (2013.01); *H04N 9/3117* (2013.01); *H04N 9/3155* (2013.01); *F21Y 2101/00* (2013.01); *F21Y 2115/00* (2016.08); *F21Y 2115/10* (2016.08); *G02F 2002/006* (2013.01); *H04N 2209/043* (2013.01)

(58) Field of Classification Search
CPC ...... H04N 9/3161; H04N 9/3197; F21V 9/08; F21V 9/20; F21V 9/30; F21V 9/40
See application file for complete search history.

(56) References Cited

U.S. PATENT DOCUMENTS

| | | | |
|---|---|---|---|
| 9,798,134 B2* | 10/2017 | Bhakta | ............... G02B 26/0833 |
| 2004/0046956 A1 | 3/2004 | Gould et al. | |
| 2004/0233664 A1 | 11/2004 | Beeson | |
| 2006/0098451 A1 | 5/2006 | Hsu et al. | |
| 2008/0309933 A1 | 12/2008 | Gould et al. | |
| 2008/0309934 A1 | 12/2008 | Gould et al. | |
| 2010/0045937 A1 | 2/2010 | Li | |
| 2010/0046234 A1 | 2/2010 | Abu-Ageel | |
| 2010/0202129 A1 | 8/2010 | Abu-Ageel | |
| 2012/0019788 A1 | 1/2012 | Katou et al. | |
| 2012/0062857 A1* | 3/2012 | Saitou | ...................... G02B 5/22 353/98 |
| 2012/0230013 A1 | 9/2012 | Xu | |
| 2013/0194552 A1* | 8/2013 | Matsubara | ......... G03B 21/2013 353/31 |

FOREIGN PATENT DOCUMENTS

| | | |
|---|---|---|
| JP | 2010-153241 | 7/2010 |
| JP | 2010-178974 | 8/2010 |
| WO | 0063680 | 10/2000 |
| WO | 2009/092041 | 7/2009 |

OTHER PUBLICATIONS

IPRP in the parent PCT application No. PCT/CN2011/083658, dated Jun. 12, 2013.
Supplementary European Search Report in correspond application EP 11847737.1, dated Jul. 12, 2016.
Chinese Office Action, dated Dec. 4, 2012, and Search Report dated Nov. 23, 2012, in a counterpart Chinese patent application, No. CN 201110403775.X.
Chinese Office Action, dated Jul. 3, 2014, and Search Report dated Jun. 25, 2014, in a counterpart Chinese patent application, No. CN 201310131461.8.
Chinese Office Action, dated Jul. 3, 2014, and Search Report dated Jun. 25, 2014, in a counterpart Chinese patent application, No. CN 201310131462.2.

* cited by examiner

LIGHT SOURCE EMPLOYING A WAVELENGTH CONVERSION DEVICE WITH A LIGHT INTRODUCING DEVICE AND A LIGHT COLLECTING DEVICE

BACKGROUND OF THE INVENTION

Field of the Invention

This invention relates to light sources, and in particular, it relates to light sources based on wavelength conversion.

Description of the Related Art

Traditional light sources, such as fluorescent light, incandescent light, ultra-high performance lamps and xenon lights, cannot achieve high efficiency and long life. With the development of solid state light sources, light emitting diodes (LED) and semiconductor laser are gaining wide use in illumination device and display device markets.

There are typically two ways of generating a white light or a color light: one method directly uses color light sources such as red, green and blue LEDs to provide color lights, or mixes these color lights to generate a white light; the other method is based on wavelength conversion, which uses an excitation light to excite wavelength conversion materials to generate color lights, and further generates a white light by mixing the excitation light and/or the converted color light. For example, a short wavelength light such as blue or UV light may be used as excitation light to excite wavelength conversion materials, which may be but are not limited to phosphors. Using green light as an example, current green LED or green laser cannot achieve high efficiency and are expensive. On the other hand, solid state light sources for blue and UV light have high efficiency and low cost; therefore, using the second method described above to generate green light has a large potential.

Using phosphor as an example, conventional light sources that use LED chip and wavelength conversion method typically coat the phosphor material on the surface of the LED chip. A problem with this is that when the converted light passes through the phosphor layer, a part of it is scattered back to the LED chip; because the LED chip absorbs a part of this light, the absorbed part of the converted light will not be output by the light source, resulting in a loss. Further, the heat generated by the LED chip and the heat generated by the wavelength conversion material interfere with each other, resulting in a reduction in the light emitting efficiency of the LED chip and the conversion efficiency of the wavelength conversion material. This can shorten the life of the LED device. For these reasons, this type of light source cannot achieve high brightness.

U.S. Pat. No. 7,070,300 discloses a method that separates the LED chip and the phosphor material to solve the above problem. As shown in FIG. 1, the excitation light from one or more LEDs 102 is collimated by a collimating device 108. A dichroic filter 110 reflects the excitation light to another collimating device 114, which focuses the excitation light onto the phosphor plate 112. The converted light from the phosphor plate 112 is transmitted through the dichroic filter 110 to become the output light. In this configuration, the converted light will not be scattered back to the LED chip, and the heat generated by the LED chip and the wavelength conversion material will not interfere with each other. The dichroic filter plate 110 separates the optical paths of the excitation light and the converted light, which facilitates the extraction of the converted light. As a result, a substantial majority of the back-scattered excitation light or converted light are recycled, thereby solving the above-described problems of the conventional technology. However, this design has its own problems: because current LED chips typically have a square or rectangular shape, its output light has a Lambertian distribution; it is difficult to design and produce highly efficient optical modules to collect and collimate the light from the LED chip. This difficulty partly prevents the commercialization of this technology. Further, because of the light separation by the dichroic filter 110, the excitation light cannot be output as a part of the output light of the light source. For example, when a blue LED is used as the exaction source, if the light source device requires blue light as a color component of the output light, a separate blue LED source needs to be added, and a light collimating device and light combination device need to be added to combine this blue light with the other color components of the output light. This will increase the cost, size and complexity of the light source.

SUMMARY OF THE INVENTION

To obviate one or more of the problems due to limitations and disadvantages of the related art, the present invention is directed to a light source which uses a simple structure to achieve separation of the excitation source and wavelength conversion material.

To achieve the above objects, the general design principle of embodiments of the present invention is: while separating the excitation light source and the wavelength conversion material, the design can accommodate both the situation where the converted light alone is extracted for output, and the situation where both the converted light and un-absorbed excitation light are extracted for output. Thus, while the design combines the optical paths of the excitation light and the converted light in order to reduce the size of the light source device, it takes care to minimize loss of the converted light due to reflection or transmission by the optical components that introduce the excitation light. Embodiments of the present invention take advantage of the near Lambertian distribution of the converted light from the wavelength conversion material, and uses collection optics with relatively large etendue to collect the converted light. In the mean time, the incoming excitation light should have relatively small etendue to increase light conversion efficiency of the wavelength conversion material; thus, embodiments of the present invention use light introducing optics that have relatively small etendue to reduce its impact on the converted light. In other words, embodiments of the present invention relies on the etendue difference between the incoming excitation light and the converted light from the wavelength conversion material to introduce the incoming excitation light into the output optical path of the converted light, while reducing loss of the un-absorbed excitation light caused by the optics that introduces the excitation light. This design achieves the separation of the converted light and the excitation light and simplifies the structure of the light source device.

To achieve these and other advantages and in accordance with the purpose of the present invention, the present invention provides a light source device, which includes: an excitation light source providing an excitation light; a wavelength conversion device located remotely from the excitation light source, including a wavelength conversion material for converting the excitation light into a converted light; a light introducing device for directing the excitation light onto the wavelength conversion material; and a light collecting device for collecting the converted light from the wavelength conversion material, wherein to separate optical paths of the excitation light and the converted light, an etendue of the light introducing device is less than or equal to ¼ of an etendue of the light collecting device, whereby a loss of the converted light through the light introducing device is reduced.

In another aspect, the present invention provides a light source device, which includes: an excitation light source providing an excitation light; a wavelength conversion material located remotely from the excitation light source, for converting the excitation light into a converted light; a light transmission device for directing and separating the input optical path of the excitation light and the output optical path of the converted light, wherein to separate the optical paths of the excitation light and the converted light, an etendue of the light transmission device for guiding the excitation light is less than or equal to ¼ of an etendue of the light transmission device for guiding the converted light.

The light source devices according to embodiments of the present invention have the advantages of a simple optical design. Their optical components are easy to manufacture, and the devices are practical. Moreover, such light source devices allow adjustment of the wavelengths of the output light according to the need of the illumination system without significant changes to the structure of the light source devices.

DETAILED DESCRIPTION OF THE PREFERRED EMBODIMENTS

Figure 1:
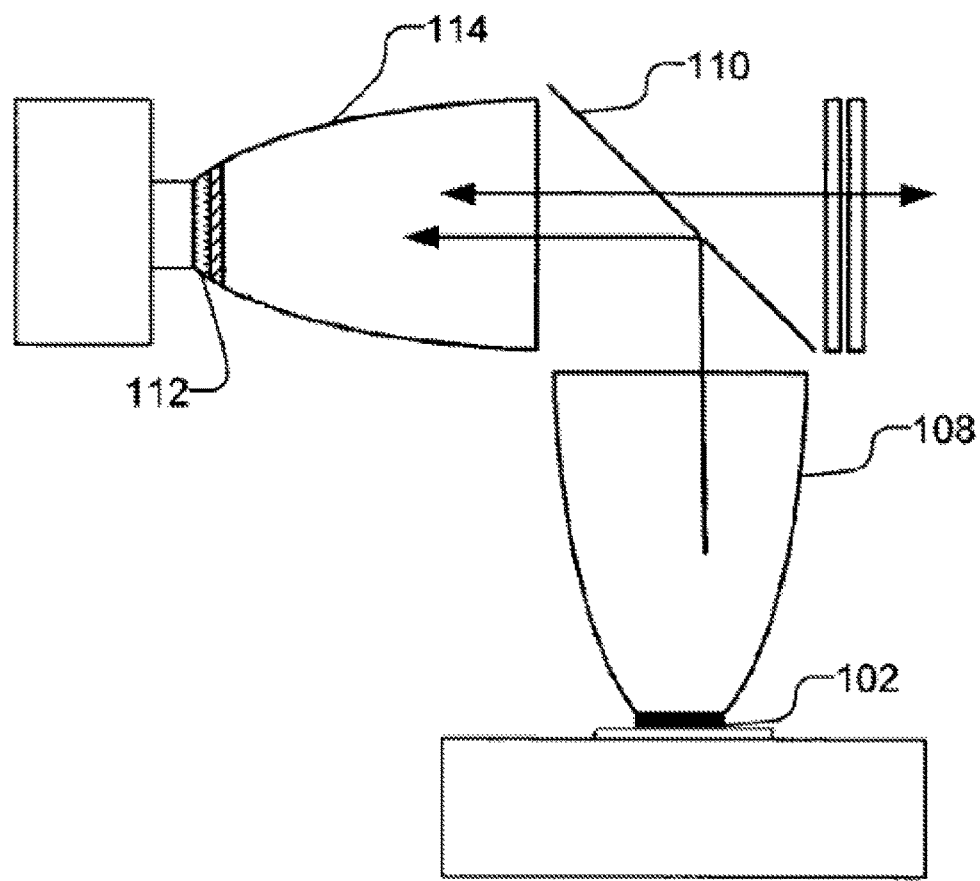
FIG. 1 illustrates the structure of a conventional light source device which generates a color light using an LED and phosphor material.

Embodiments of the present invention will be described below with reference to the drawings.

A design premise of embodiments of the present invention, which separates optical paths of the excitation light and converted light, is that the light source device includes a wavelength conversion material and an excitation light source providing an excitation light. A light collecting device is used to collect and direct the converted light from the wavelength conversion material, as well as the unabsorbed portion of the excitation light, as the output light of the light source device. The etendue of the excitation light source is less than or equal to ¼ of the etendue of the light collecting device. A light introducing device having an etendue similar to the etendue of the excitation light is provided; it utilizes the optical path of the converted light collected by the light collecting device to introduce the excitation light from the excitation light source onto the wavelength conversion material.

The wavelength conversion material may include phosphor, nano light emitting materials, or light emitting dye. The materials may be bounded by one or more transparent materials to provide stable light emitting properties. Using phosphor as an example (but the invention is not limited thereto), the transparent material may be a transparent gel (such as but not limited to silicone gel) or a transparent glass material, mixed with the phosphor and formed into a desired shape. Transparent films may also be used, onto which the phosphor may be hot-pressed. The wavelength conversion material may be applied as a coating or adhesive foil to form a wavelength conversion device. If the phosphor needs to be protected from moisture, the above described transparent material can be used to sandwich the phosphor and to seal it. To enhance scattering of the excitation light by the wavelength conversion material and enhance the absorbance of excitation light by the wavelength conversion material, a scattering material, such as titanium oxide particles of aluminum oxide particles, may be mixed into the wavelength conversion material.

The excitation light source may be a solid state light emitting device, such as but not limited to LEDs or semiconductor lasers emitting at short wavelengths such as UV or blue range. Using blue excitation light as an example, the wavelength conversion material may be red, green and yellow phosphors that convert blue light into red, green and yellow lights, respectively. It should be noted that, when the wavelength conversion material includes a yellow phosphor which converts blue light into yellow light, a suitable number or amount of wavelength conversion material may be used such that the light from the wavelength conversion material including the yellow converted light and the unabsorbed blue excitation light are mixed to generate a white output light.

A light source device according to an embodiment of the present invention is described with reference to FIG. 2. The light source device includes an excitation light source 110 for providing an excitation light, and a wavelength conversion device located remotely from the excitation light source, the wavelength conversion device including a wavelength conversion material 150 for converting the excitation light into converted light. The light source device also includes a light introducing device for introducing the excitation light onto the wavelength conversion material (e.g., the aperture on the reflector 130A), and a light collecting device for collecting the converted light from the wavelength conversion material (such as lens set 330 and reflector 130A). In various embodiments, the light introducing device and the light collecting device may be implemented in various forms; but to separate the optical paths of the converted light and the excitation light, the etendue of the light introducing device should be less than or equal to ¼ of the etendue of the light collection device, so that the light introducing device can both introduce the excitation light and avoid excess amount of converted light escaping through it.

In optics, etendue is used to describe the spatial distribution or spread of the light in area and angle. Wavelength conversion material can increase the etendue of light. In the embodiment shown in FIG. 2, the excitation light from the excitation light source 110 passes through the aperture to illuminate on the wavelength conversion material 150; the converted light emitted by the wavelength conversion material has a near Lambertian distribution, with a much larger etendue than the excitation light. The converted light emitted toward the collecting device, as well as the portion of the excitation light un-absorbed by the wavelength conversion material, are collected by the collimating lens set 330 into a near parallel light which falls on the reflector 130. A majority of this light is reflected by the reflector 130A to become useful output light, and a small portion of the light escapes through the aperture and become lost. Because the excitation light from the excitation light source 110 has a relatively small etendue, the size of the aperture can be controlled to take a very small fraction of the area of the light collecting device. On the other hand, the converted light collected by the collimating lens set 330 has a relatively large etendue, so the loss of the converted light through the aperture can be controlled to be in an acceptable range. In practice, it is acceptable when the projection area of the aperture on the lens set 330 is less than or equal to ¼ of the area of the lens set itself.

Figure 2:
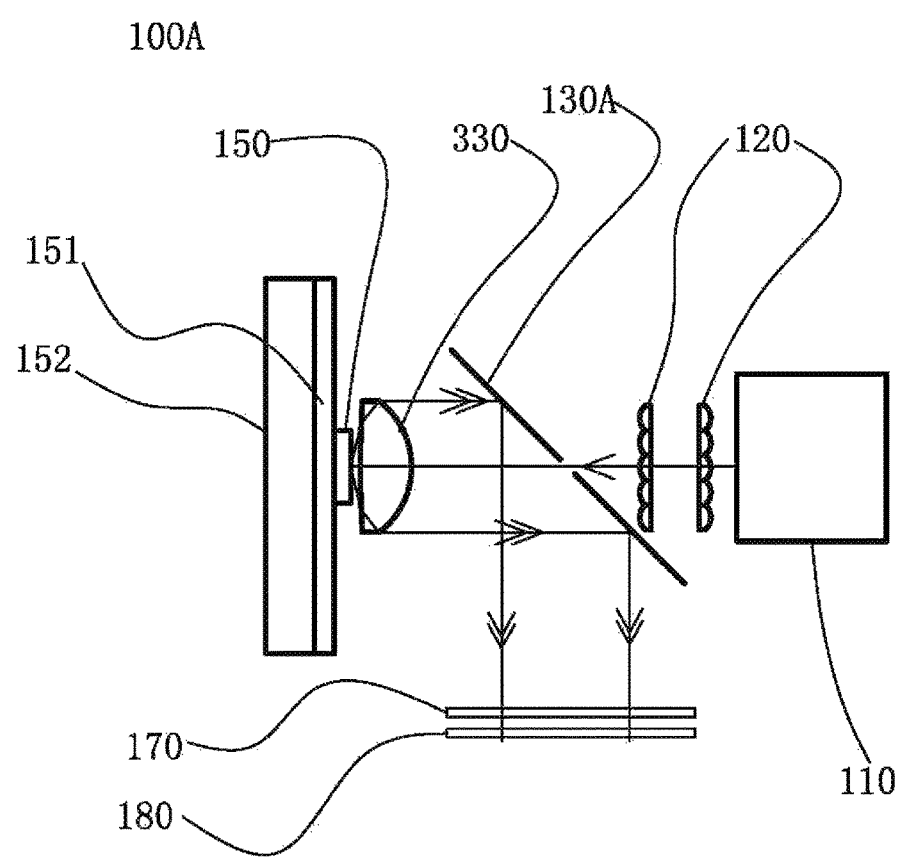
FIG. 2 illustrates a light source device according to an embodiment of the present invention, which uses light collecting optics having an aperture to separate the optical paths of the input and output light.

As shown in FIG. 2, the wavelength conversion device may include a substrate having a reflective surface (such as but not limited to a heat sink 151) and the wavelength conversion material is disposed on the reflective surface. The wavelength conversion material is located between the reflective surface and the lens set 330, which allows the converted light emitted from both sides of the wavelength conversion material to travel in one direction and be collected by the lens set 330, increasing the light utilization efficiency of the light source device. The wavelength conversion material may further includes a heat dissipating device 153 immediately adjacent to the heat sink 151, which helps heat dissipation from the wavelength conversion material, thereby preventing degradation of its light conversion efficiency. The wavelength conversion device 150-152 can be designed to be moveable or rotatable, which can further improve heat dissipation.

The light source device shown in FIG. 2 further includes a light smoothing device, disposed between the excitation light source 110 and the light introducing device (aperture), for making the excitation light uniform and shaping it. The light smoothing device may be but is not limited to a fly-eye lens array 120 which can form the excitation light into a rectangular shape with a 4:3 aspect ratio. Based on the various application requirements such as projection light, stage light, television, or search light, the light smoothing device may use other forms of lens array, a hollow or solid light rod, or a light scattering plate.

A filter plate, brightness enhancement plate, or polarizing reflector plate may also be provided in the light source device. It can be disposed near the entrance port or exit port of the light collecting device, or immediately adjacent the wavelength conversion material, to achieve desired effects. As shown in FIG. 2, a filter plate 180 disposed at the exit port can be used to adjust the spectrum of the output light of the light source device. If the filter plate 180 is chosen to reflect the excitation light and transmit the converted light, output converted light with high color purity can be achieved, and at the same time, un-absorbed excitation light can be reflected by the reflector 130A back to the wavelength conversion material to be recycled two or more times. This improves the color purity of the output light. A film 170 on the filter plate 180 may be a brightness enhancement film or diffractive optical film. Alternatively, a brightness enhancement plate or a polarizing reflector plate can be used in lieu of the film 170 and filter plate 180, to enhance the brightness of the output light or to generate a polarized light. The filter plate, brightness enhancement film, or polarizing reflector plate are well known in the art and their detailed descriptions are omitted. It should be pointed out that such plate or film can also be disposed on the surface of the wavelength conversion device, in particular, the surface of the wavelength conversion material. For example, a filter disposed between the excitation light and the wavelength conversion material can be formed by multiple dielectric films to achieve desired light transmission properties, such as but not limited to: transmitting all converted light, transmitting excitation light in incident angles between 0-15 degrees, and reflecting excitation light with incident angles larger than 15 degrees. Such a filter selectively transmits the converted light, and transmits small-angle excitation light from the excitation light source, but effectively blocks excitation light scattered by the wavelength conversion material 150, thereby improving the utilization efficiency of the excitation light.

The light collecting device and light introducing device in the embodiment of FIG. 2 may be replaced by various other components of combinations. The light source devices according to various embodiments of the present invention have the following features: The converted light collected by the light collecting device is outputted via an output path of the light source device; the light introducing device is a second reflecting device disposed in the output path, the second reflecting device having a reflecting surface that reflects the excitation light from the excitation light source to the wavelength conversion material; an output light spot size of the converted light is 4 times or more of the size of the second reflecting device projected at the location of the output light spot. Using FIG. 3 as an example, the light source device includes an excitation light source 110, a wavelength conversion device located remotely from the excitation light source (including at least a wavelength conversion material 150 for converting the excitation light into converted light), a light collecting device such as the lens set 330, and a second reflecting device such as the reflector plate 130B. The input excitation light is reflected by the reflector plate 130B toward the wavelength conversion material 150. The converted light emitted from both sides of the wavelength conversion material is reflected by the wavelength conversion device and collected by the lens set 330, and is output as a near parallel light. The size of the reflector plate 130B is small compared to the size of the lens set 330, so that the proportion of the converted light blocked by the reflector plate 130B can be controlled to be within an acceptable range. In practice, it is acceptable if the area of the reflector 130B projected onto the lens set 330 is less than or equal to ¼ of the area of the lens set 330.

In the illustrated embodiment, the reflector 130B is disposed at an angle such that the input light and the output light form a 90 degree angle. Other angles may be used as well. The shape of the reflector plate 130B may be circular, elliptical, rectangular, or even irregular shapes. Also, the surface of the reflector 130B may be flat or curved, such as spherical, ellipsoidal, paraboloidal, or free shape; the reflector plate can also be replaced by an object having a reflective surface. Further, the reflector plate 130B may be replaced by a filter plate that transmits the converted light and reflects the excitation light; this further reduces the loss of the converted light due to the light introducing plate 130B.

Likewise, the lens set 330 may be replaced by other imaging or non-imaging optical components or combinations that act as the light collecting device. For example, a lens, hollow light guide, solid light guide, hollow compound light condenser, solid compound light condenser, flat reflecting surface, curved reflecting surface, or their combinations. Commercially available tapered rectangular light rods, or the hollow or solid compound light condenser described in U.S. Pat. No. 3,923,381, etc., can be used. These devices are well known in the art and are not described in detail here.

Figure 3:
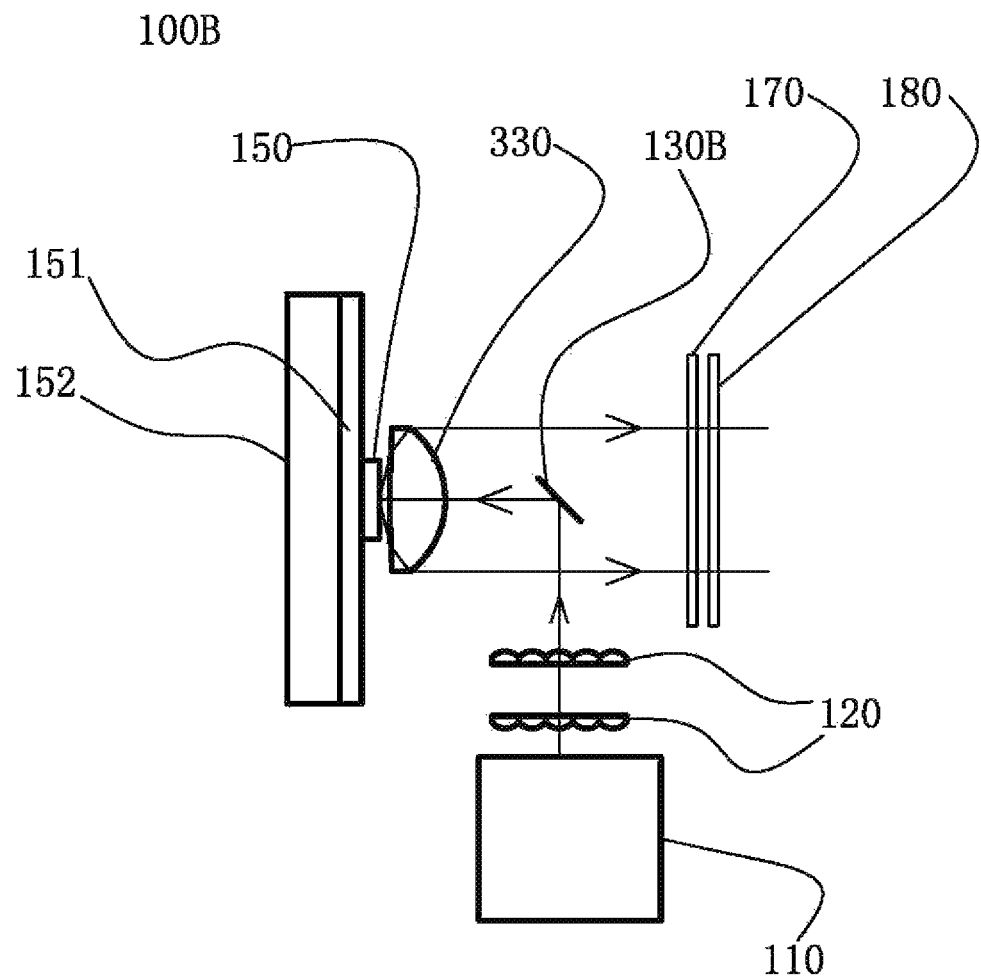
FIG. 3 illustrates a light source device according to another embodiment of the present invention, which uses a reflector in the path of the converted light as the light introducing device for the excitation light.

Summarizing the embodiments shown in FIGS. 2 and 3, the light introducing device may be a flat reflector or a curved reflector, or it may be an aperture on the light collecting device with a shape matching the light spot shape of the input excitation light. The light source devices according to these embodiments have the following features: The light collecting device includes a first reflecting device for changing the traveling direction of the converted light; the light introducing device is an aperture on the first reflecting device, such that the excitation light from the excitation light source passes through the aperture to illuminate the wavelength conversion material; the size of the aperture is less than or equal to ¼ the effective reflecting area of the first reflecting device. FIG. 2 is one representative example of such a light source device, where the first reflecting device includes a reflective surface with an aperture, such as the reflector 130A having the aperture. The aperture may be covered with a dielectric file that transmits the excitation light and reflects the converted light, which reduced the loss of the converted light.

Many variations of the embodiment shown in FIG. 2 can be used, as shown in FIGS. 4-11. In FIGS. 4-11, similar or same components are labeled with similar or same symbols. When some components have similar functions as corresponding components in FIG. 2 or other variations, detailed descriptions will not be repeated.

In the light source device, the first reflecting device may be a semi-ellipsoidal or hemispherical shape, with an inward facing reflective surface, which offers higher efficiency and a more compact structure as compared to the flat reflector. In the examples shown in FIGS. 4 and 7, when the first reflecting device is a semi-ellipsoidal shape, the input port of the light collecting device is centered approximately at a focal point of the first reflecting device, and the illumination spot of the excitation light on the wavelength conversion material is located approximately at the other focal point of the first reflecting device. In the examples shown in FIGS. 5 and 6, when the first reflecting device is a hemispherical shape, the input port of the light collecting device is centered adjacent the spherical center of the first reflecting device; the illumination spot of the excitation light on the wavelength conversion material is located adjacent the spherical center of the first reflecting device, aligned with the input port of the light collecting device; and the input port of the light collecting device is located on a side of the wavelength conversion material that is the opposite of the incident excitation light.

Figure 4:
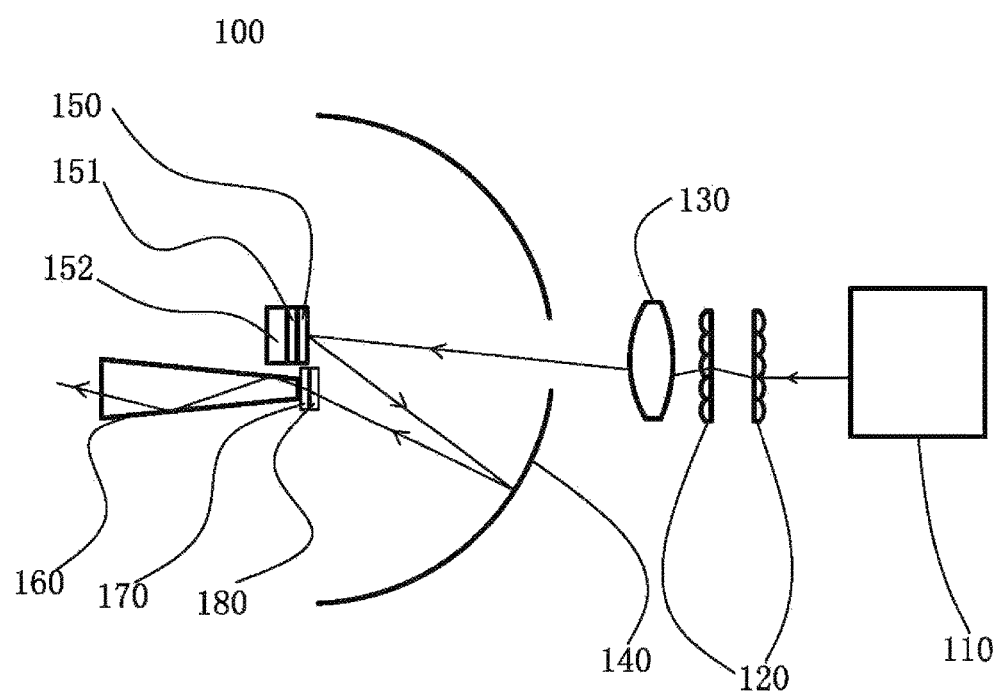
FIG. 4 illustrates a light source device according to another embodiment of the present invention, which uses an ellipsoidal reflector.

In the embodiment shown in FIG. 4, the light source device includes an excitation light source 110 and a wavelength conversion device (including at least a wavelength conversion material 150). The first reflecting device is a hollow semi-ellipsoidal reflector 140 which is coated with a reflective film on the interior surface. The light passage is an aperture on the wall of the reflector 140. The reflective film is a metal film or dielectric film that reflects both the excitation light and the converted light. In this embodiment, the light collecting device includes a tapered rectangular light rod 160 and the reflector 140, where the light entrance port of the light rod 160 is disposed approximately at one focal point of the semi-ellipsoidal reflector 140. Similar to the previously described embodiments, the wavelength conversion device includes wavelength conversion material 150. Preferably, the wavelength conversion device also includes a substrate coated with a reflective film or having a reflective surface (such as but not limited to a heat sink 151), where the wavelength conversion material is disposed on the reflective surface or reflective film of the heat sink 151 and faces the reflecting surface of the reflector 140. In other words, the wavelength conversion material is located between the reflective surface of the heat sink 151 and the reflector 140, which helps the converted light emitted from both sides of the wavelength conversion material 150 to be output from the same side. A heat dissipating device 152 may be provided immediately adjacent the heat sink 151 to help heat dissipation. The positioning of the wavelength conversion device is such that the illumination spot on wavelength conversion material 150 is located approximately at the other focal point of the first reflecting device. A light smoothing device includes a lens array 120 as described in earlier embodiments, as well as a focusing lens 130 that focuses the excitation light to the other focal point of the reflector. Assuming the light smoothing device shapes the input light spot into a uniform rectangle with a 4:3 aspect ratio, the excitation light from the excitation light source 110 passes through the light smoothing device and the aperture to form a rectangular light spot at the other focal point where the wavelength conversion material is located. The converted light emitted by the wavelength conversion material 150 and the un-absorbed excitation light are reflected by the semi-ellipsoidal reflector 140 to the entrance port of the light rod 160 which is located at the first focal point. The light rod 160 collects and mixes the converted light and un-absorbed excitation light to produce a uniform mixed light having a rectangular shape. In addition, a filter plate 180 may be provided at the entrance port of the light rod to adjust the spectrum of the output light and to improve its color purity. In this embodiment, controlling the size of the aperture is important in order to reduce loss of the converted light and the un-absorbed excitation light. Through testing, the inventors determined that when the radius of the aperture is 20% of the longest semi-principal axis of the ellipsoid, the loss of the converted light is about 4% of the total amount of converted light. Therefore, in practice, the radius of the aperture should be less than or equal to ½ of the longest semi-principal axis.

Figure 7:
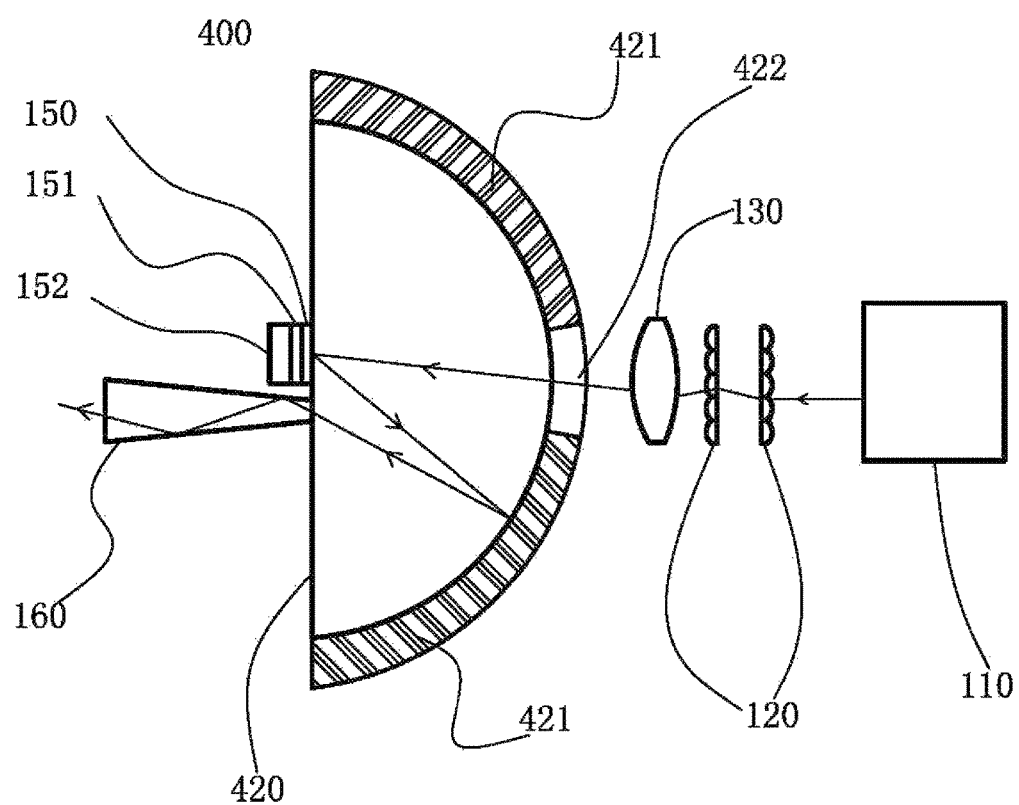
FIG. 7 illustrates a light source device according to another embodiment of the present invention, which is a variation of the embodiment of FIG. 4.

The embodiment shown in FIG. 7 is similar to that shown in FIG. 4; one difference is that, in FIG. 7, the first reflecting device is a solid semi-ellipsoidal transparent body 420 coated with a reflective film 421 on its exterior surface. The aperture is an opening 422 in the reflective film. The reflective film 421 is a metal or dielectric film that reflects both the excitation and the converted light. In the embodiment of FIG. 7, a filter plate 180 is not provided at the entrance port of the light collecting element 160; thus, the converted light and the un-absorbed excitation light are mixed to produce the output light. Another difference from FIG. 4 is that, in FIG. 7, an air gap may be provided between the wavelength conversion material at the illumination point and the transparent body 420; the air gap may have a thickness that is less than 1% of the longest semi-principal axis. The air gap helps to enhance the output brightness of the light source device.

In the embodiments of FIG. 4 or 7, the aperture may be located at an off-centered position on the semi-ellipsoidal first reflecting device. Its position, i.e. the distance from the aperture to the apex of the reflector, may be determined by the position of the focal point where the wavelength conversion material is disposed, such that the collimated excitation light is incident perpendicularly onto the wavelength conversion material. This way, if the wavelength conversion material 150 accidentally falls off of the heat sink 151, the perpendicularly incident excitation light can be reflected directly back to the aperture and out of the first reflecting device. This will prevent the bright excitation light (especially when a laser light is used as the excitation light) from being reflected by the first reflecting device into the light collecting element 160 and becoming the output light, which can potentially damage users eyes.

Figure 5:
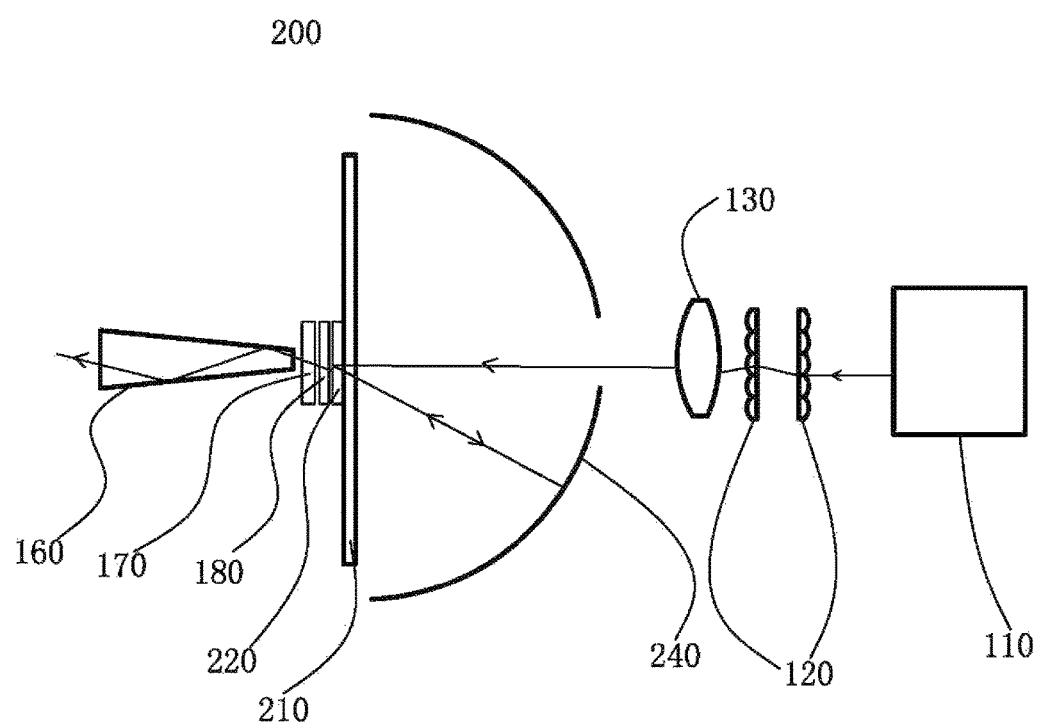
FIG. 5 illustrates a light source device according to another embodiment of the present invention, which uses a hemispherical reflector.

In the embodiment shown in FIG. 5, the light source device includes an excitation light source 110 and a wavelength conversion device (including at least a wavelength conversion material 220). The first reflecting device is a hollow hemispherical reflector 240 which is coated with a reflective film on the interior surface. The light passage is an aperture on the wall of the reflector 240. The reflective film is a metal film or dielectric film that reflects both the excitation light and the converted light. In this embodiment, the light collecting device includes a tapered rectangular light rod 160 and the reflector 240, where the light entrance port of the light rod 160 is disposed near the spherical center of the reflector 240. The wavelength conversion device includes a transparent substrate 210 carrying a wavelength conversion material 220. The wavelength conversion material is disposed near the spherical center of the reflector 240, aligned with the light entrance port of the light rod 160, and the light entrance port of the light rod is on a side of the wavelength conversion material that is the opposite of the incident excitation light. The wavelength conversion material 220 may be coated on the side of the substrate 210 that faces the light rod 160, or on the side that faces the reflector 240. Alternatively, the wavelength conversion material 220 may be mixed in a glass, ceramic or other material to form a standalone wavelength conversion device that has sufficient mechanical strength and does not require a substrate. This way, the transparent substrate 210 can be omitted, which increases the extraction of the converted light.

A focusing lens 130, which is a part of a light smoothing device, focuses the excitation light to the spherical center of the reflector. The excitation light from the excitation light source 110 passes through the light smoothing device and the aperture to form a rectangular light spot with a 4:3 aspect ratio at the center of the reflector. The converted light is emitted from both sides of the wavelength conversion material with Lambertian distributions. The forward traveling converted light is directly collected by the light rod 160, and the backward traveling converted light is reflected by the reflector 240 back to the wavelength conversion material 220. Because the wavelength conversion material does not significantly absorb the converted light emitted by itself, the reflected converted light effectively passes through the wavelength conversion material 220 to be collected by the light rod 160. Meanwhile, the hemispherical reflector 240 reflects the un-absorbed excitation light back to the wavelength conversion material 220 to be recycled two or more times, which increases the utilization efficiency of the excitation light. The light rod 160 can collect the converted light and un-absorbed excitation light and provide a mixture of these two lights. A filter plate 180 or brightness enhancement plate 170 may be disposed at the light entrance port of the light rod 160 to adjust the spectrum or brightness of the output light. Similar to the embodiments of FIGS. 4 and 7, controlling the size of the aperture is important in order to reduce loss of the converted light and the un-absorbed excitation light. In practice, the radius of the aperture should be less than or equal to ½ of the radius of the reflector 240.

Figure 6:
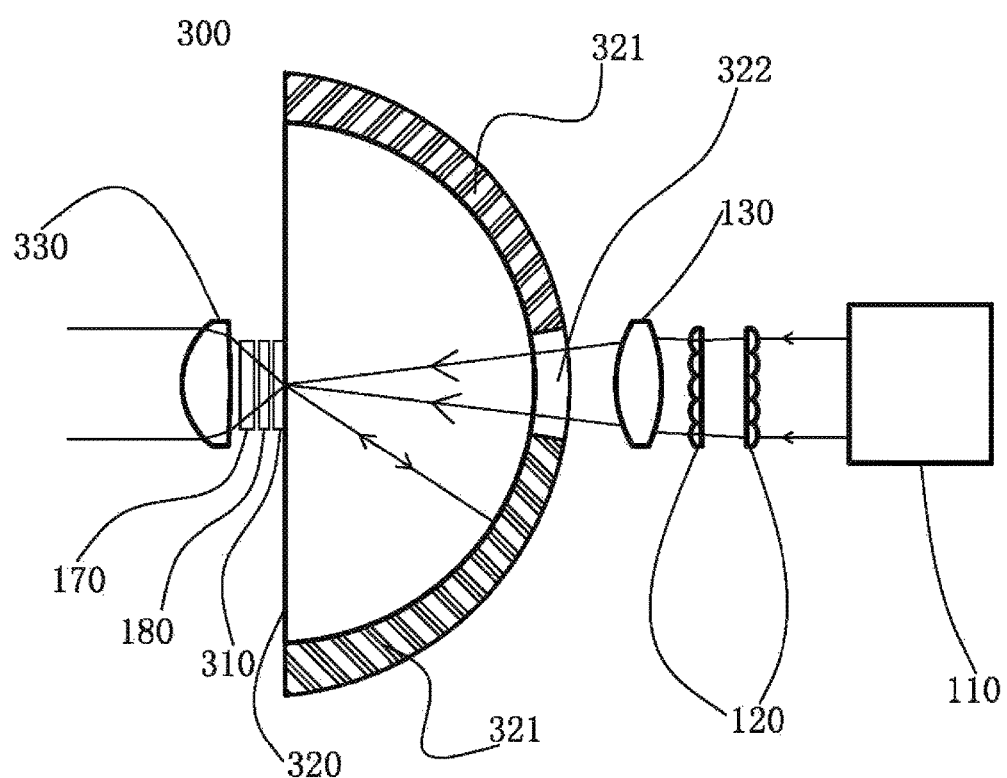
FIG. 6 illustrates a light source device according to another embodiment of the present invention, which is a variation of the embodiment of FIG. 5.

The embodiment of FIG. 6 is similar to that shown in FIG. 5, the difference being, in FIG. 6, the first reflecting device is a solid hemispherical transparent body 320 coated with a reflective film 321 on the exterior surface. The aperture is an opening 322 in the reflective film. The reflective film 321 is a metal or dielectric film that reflects both the excitation light and the converted light. The wavelength conversion device may be a wavelength conversion material 310 (or a wavelength conversion material mixed with other materials such as silicone, scattering materials, etc.) disposed on the transparent hemispherical body 320 in the form of a coating or foil. Another difference from FIG. 5 is, in FIG. 6, an air gap may be provided between the wavelength conversion material 310 at the illumination point and the transparent body 320; the air gap may have a thickness that is less than 1% of the radius of the hemisphere. The air gap helps to enhance the output brightness of the light source device. Further, to illustrate the variety of design possibilities, in this embodiment, a lens or lens set 330 replaces the light rod 160 shown in FIG. 5. The filter plate 180 or brightness enhancement plate 170 or a polarizing plate can be used between the wavelength conversion material 310 and the lens 330 to change the characteristics of the output light as described earlier.

In the embodiments of FIGS. 6 and 7, the transparent body may be made of transparent glass or plastic. The aperture 322 or 422 can be covered with a dielectric film that transmits the excitation light and reflects the converted light, which further reduces loss of the converted light through the aperture.

Figure 8:
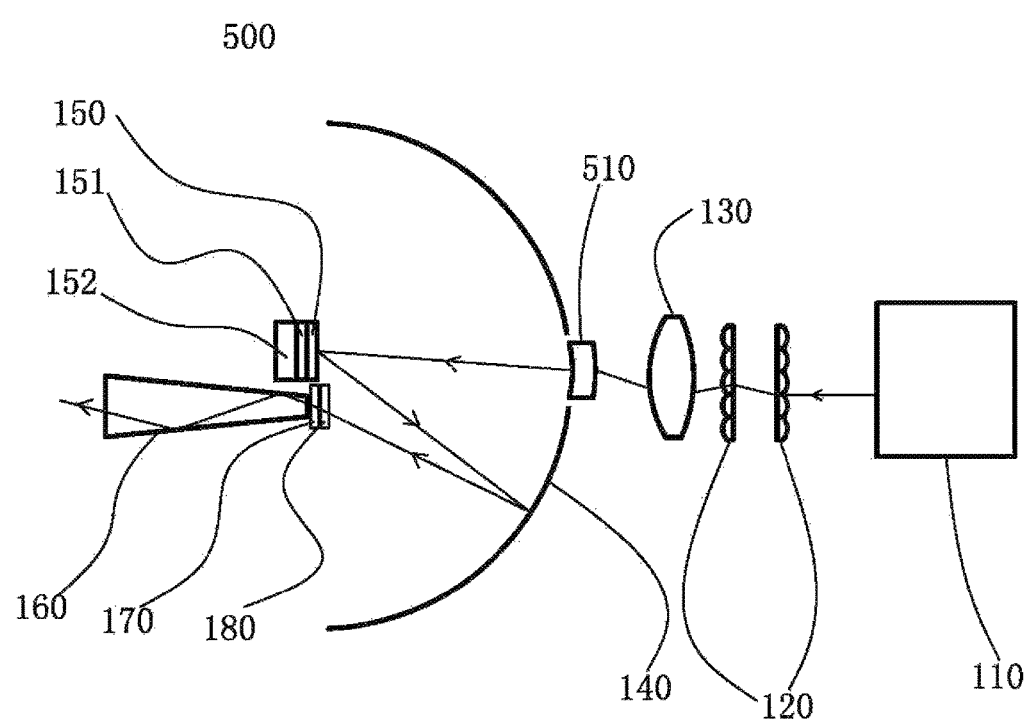
FIG. 8 illustrates a light source device according to another embodiment of the present invention which is an improvement of the embodiment of FIG. 4.
Figure 9:
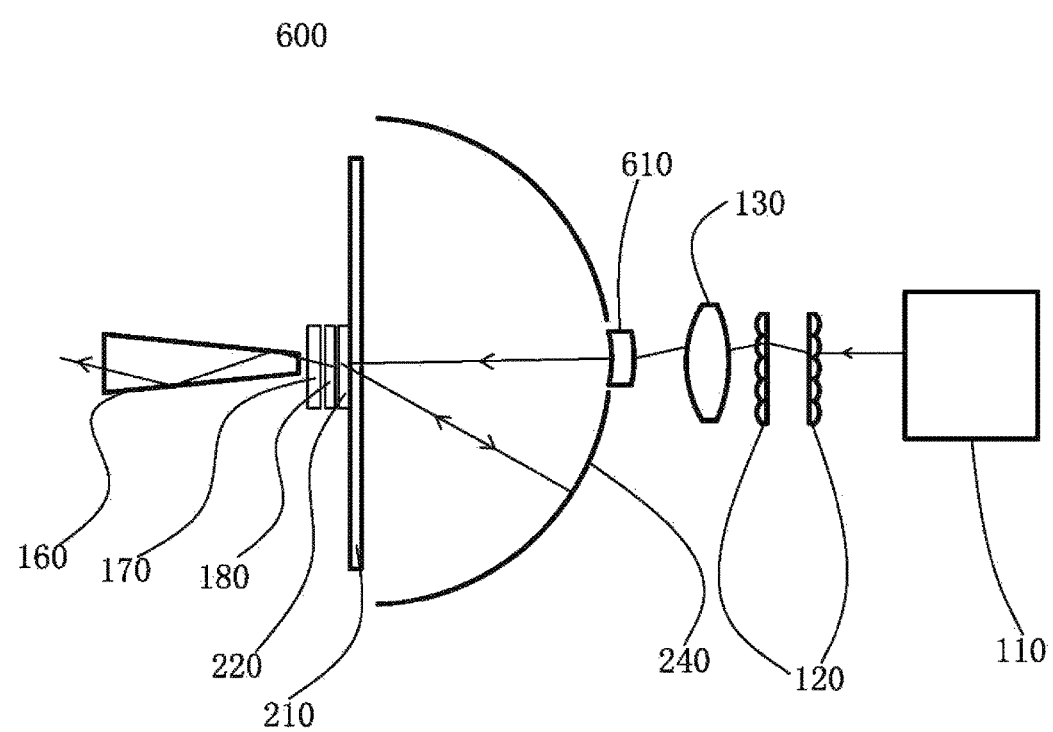
FIG. 9 illustrates a light source device according to another embodiment of the present invention which is an improvement of the embodiment of FIG. 5.

In the embodiments of FIGS. 5 and 6, the aperture is located at the apex of the first reflecting device, so that the excitation light from the excitation light source is substantially directly illuminated on the wavelength conversion material. In addition, to reduce the loss of the converted light due to the aperture, a filter may be provided at the aperture, where the filter has a curved surface with a curvature matching the curvature of that of the first reflecting device at the location of the aperture, so that the dielectric film coated on the filter and the reflective film coated on the reflector smoothly connect with each other. The dielectric film of the filter transmits the excitation light and reflects the converted light. The light source device shown in FIG. 8 is similar to that shown in FIG. 4 but has an additional filter device, such as but not limited to a coated lens 510. The left surface of the coated lens 510 has a curvature identical to the curvature of the semi-ellipsoidal reflector 140, and is coated with a dielectric film that transmits the excitation light and reflects the converted light. The right surface of the lens 510 is designed to have a shape, such as but not limited to a convex shape, to focus the incident excitation light onto the wavelength conversion material 150. The light source device shown in FIG. 9 is similar to that shown in FIG. 5 but has a coated lens 610 at the aperture. The structure and function of the lens 610 are similar to those of the lens 510 in FIG. 8, and are not described in detail. The coated lens 610 of 510 can be replaced by a curved filter plate which transmits the excitation light and reflects the converted light. In fact, in FIGS. 6 and 7, the dielectric film covering the aperture 322 or 422 discussed above are other implementations of the filter device.

Figure 10:
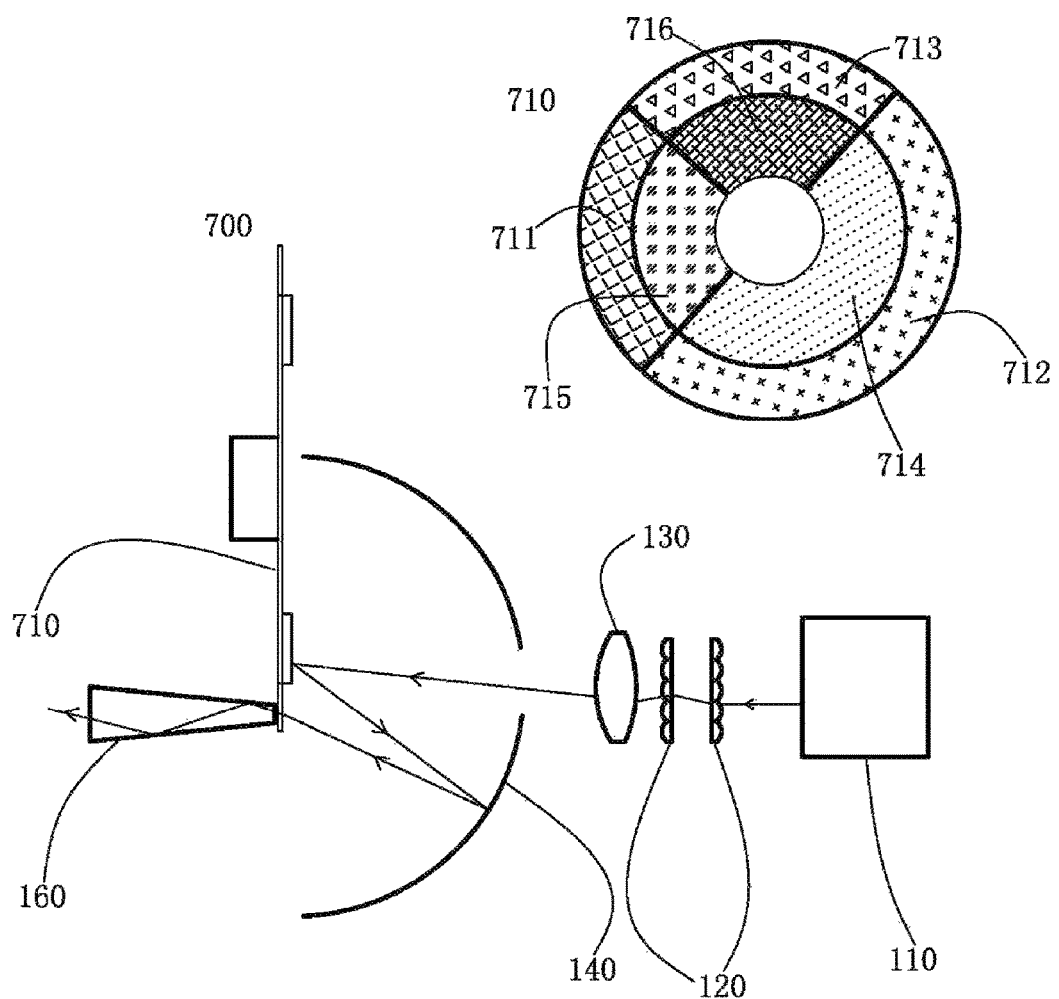
FIG. 10 illustrates a light source device according to another embodiment of the present invention which is another improvement of the embodiment of FIG. 4.

Additional embodiments of the present invention also include various improvements of the embodiments of FIGS. 2-8. For example, the wavelength conversion device may be a moving member carrying a wavelength conversion material, where the movement of the moving member causes the wavelength conversion material carried in predetermined segments of the wavelength conversion device to be alternatingly disposed in the illumination spot of the excitation light formed by the light introducing device. This helps heat dissipation from the wavelength conversion material, thereby extending the life of the light source devices, in particular, high power light source devices. The moving member may include a rotating plate, a rotating cylinder, or a moving platform. The substrate within the predetermined segments that carry the wavelength conversion materials may be a reflective material or a transparent material. Preferably, the substrate is a heat sink with a reflective surface, where the wavelength conversion material is disposed on the reflective surface facing the light collecting device. FIG. 10 illustrates an improvement of the light source device shown in FIG. 4. Using a blue excitation light as an example, the wavelength conversion device includes a rotating wheel 710, the circular substrate of the rotating wheel is a material, such as but not limited to metal or glass, for carrying the wavelength conversion material. The circular substrate is coated with a reflective material, and then coated with one or more wavelength conversion materials. The wavelength conversion materials are located in segments forming a predetermined pattern, such as but not limited to a red phosphor segment 714, a green phosphor segment 715, and a reflective segment 716 that does not carry any phosphor materials. The reflective surface may be covered with a barium sulfate of Teflon™ coating. The wavelength conversion material can also be mixed with a scattering material. To obtain desired output light spectrum, a filter plate may be provided adjacent the wavelength conversion material between the wavelength conversion material and the light collecting device. Different filter plates may be provided corresponding to different phosphor segments. For example, a red filter segment 712 corresponds to the red phosphor segment 714, to filter the light emitted by the red phosphor to increase its color purity. Similarly, a green filter segment 711 corresponds to the green phosphor segment 715, and a blue filter segment or a glass plate coated on both sides with antireflection coating 713 corresponds to the reflective segment 716. The filter segments 711, 712 and 713 and wavelength conversion material segments 714, 715 and 716 are assembled and driven by a motor to rotate together. The rotating speed of the motor may be synchronized with the frequency required by a projector device in which the light source device is used. The green filter segment 711 and red filter segment 712 can reflect blue light, so that the blue light reflected by the green phosphor 715 or red phosphor 714 can be reflected back to the wavelength conversion material by the filter segments 711 or 712. Meanwhile, because the filter segments 711 and 712 reflects a part of the excitation light back to the wavelength conversion material, the shorter wavelength portion of the excitation light can be absorbed by the wavelength conversion material and converted to converted light. This way, filter segments 711, 712 and 713 function to recycle light energy, thereby increasing the system efficiency.

Figure 11:
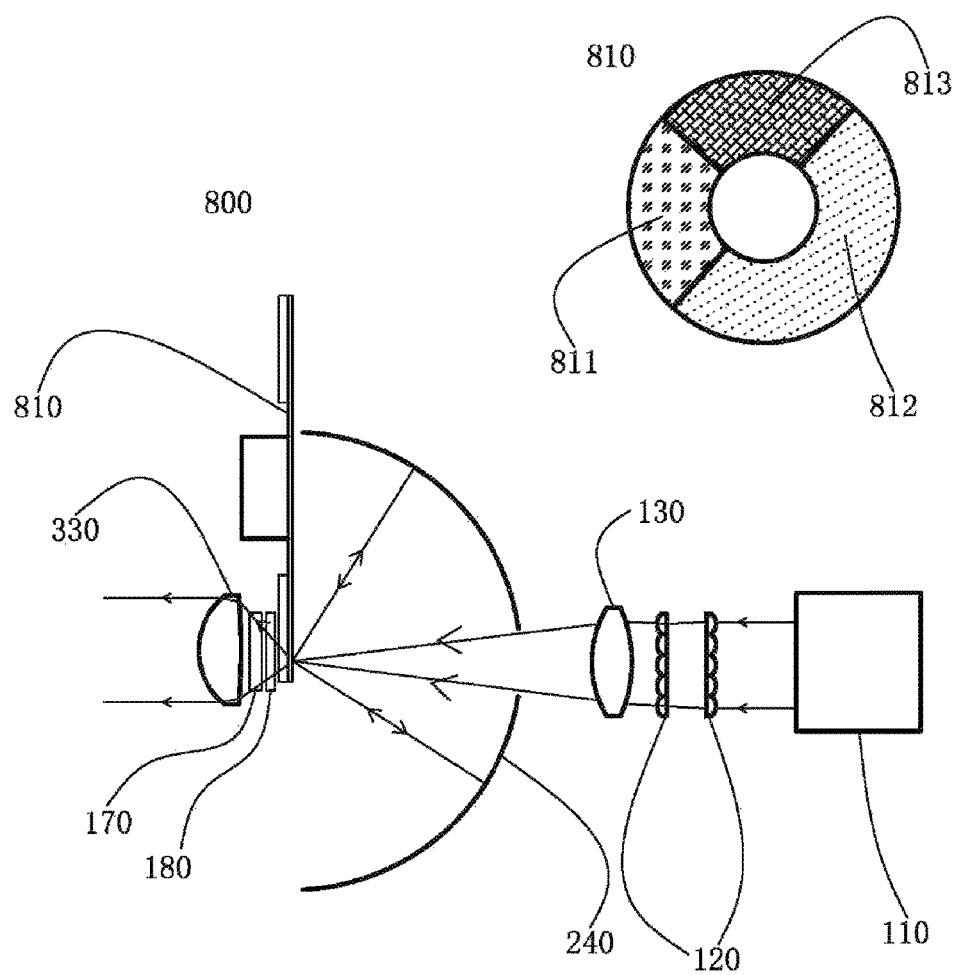
FIG. 11 illustrates a light source device according to another embodiment of the present invention which is another improvement of the embodiment of FIG. 5.

FIG. 11 illustrates an improvement of the light source device shown in FIGS. 5 and 6. A difference from FIG. 10 is that in FIG. 10, the substrate segments of the wavelength conversion device that carries the wavelength conversion material are a reflective material, while in FIG. 11 the substrate is made of a transparent material. In other words, the segments of the circular substrate of the wheel 810 that carry the wavelength conversion materials or scattering materials are transparent. Similar to FIG. 10, multiple wavelength conversion materials may be carried in different segments of the wheel, such as but not limited to segments 812, 813 and 814. Detailed descriptions are omitted here.

Figure 12:
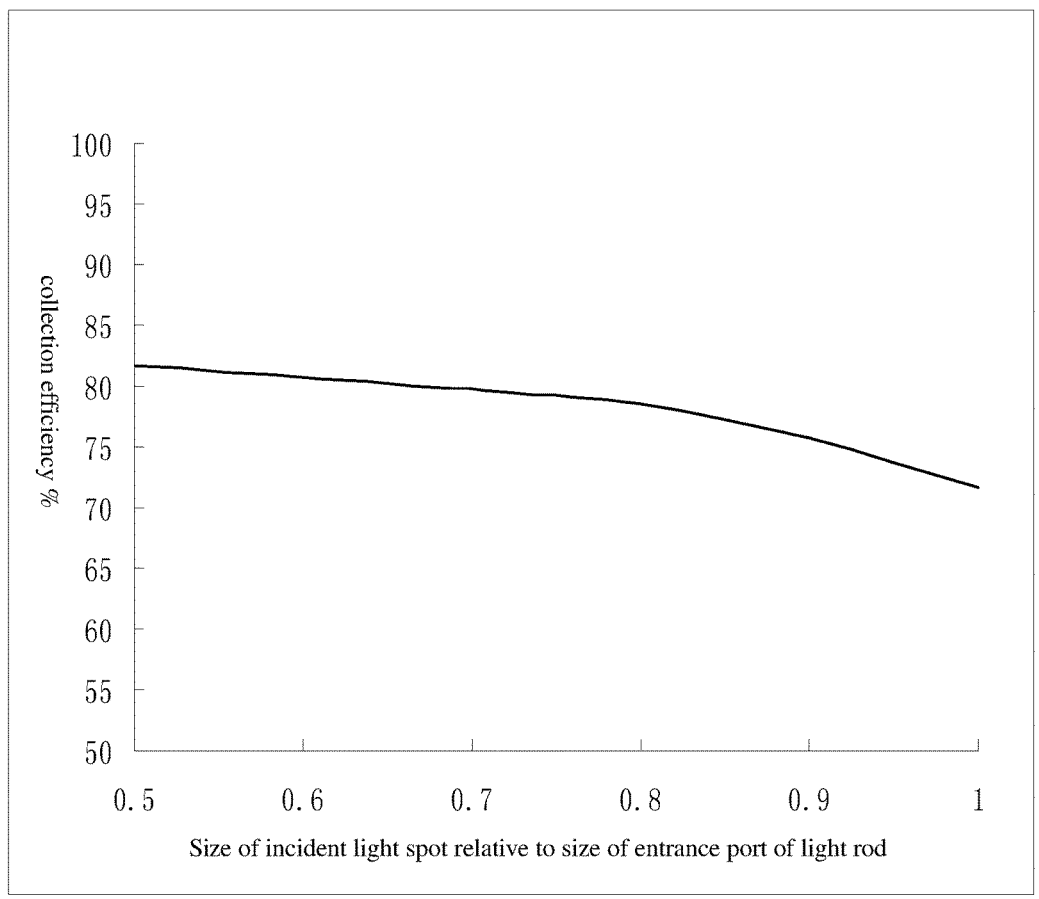
FIG. 12 is a curve showing the effect of the size of the excitation light spot on the light collection efficiency.

In one implementation of FIG. 3, for example, the reflector is a hemispherical reflector with a diameter of 20 mm, and its interior surface has a reflectivity of 96%. The light collecting device is a tapered rectangular light rod, with an entrance port size of 2.3 mm×1.8 mm, an exit port size of 4.7 mm×3.7 mm, a length of 20 mm, and its interior surface has a reflectivity of 97.5%. Given these parameters, when the light spot of the excitation light illuminating on the wavelength conversion material is smaller than the size of the entrance port of the light rod, the converted light can be effectively collected. FIG. 12 shows a ray-tracing simulation result; it shows that when the illumination light spot is 0.8 of the entrance port of the light rod, i.e., when the illumination light spot is 1.84 mm×1.44 mm, the light collection efficiency is 78.5%.

In addition, the inventor discovered that the light source devices of FIG. 4 or 7 can be improved as follows. The semi-ellipsoidal reflector 140 or semi-ellipsoidal transparent body 420 can be replaced by easier-to-manufacture hemispherical or spherical reflector or transparent body as the first reflecting device. The light entrance port of the light collecting device is disposed near the spherical center of the first reflecting device, and the wavelength conversion device is positioned such that the illuminated spot of the wavelength conversion material is located near the spherical center and is symmetrical to the entrance port with respect to the spherical center. The closer the illuminated spot and the entrance port are to the spherical center the better. The wavelength conversion device preferably also includes a reflective substrate (such as but not limited to a heat sink), where the wavelength conversion material is disposed on the reflective surface of the substrate and faces the reflective surface of the first reflecting device. These improvements increases light collection and light conversion efficiencies. Also, to prevent damage to users' eyes when the wavelength conversion material accidentally falls off from the substrate, the aperture may be located at an off-centered position on the hemispherical reflector, so that the excitation light is incident perpendicularly on the wavelength conversion material which is located at an off-centered position.

It should be understood that, in addition to the above-described hemispherical and semi-ellipsoidal shapes, the first reflecting device may have other curved shapes, even non-smooth shapes, such as serrated reflectors, which are not described in detail here.

Figure 13:
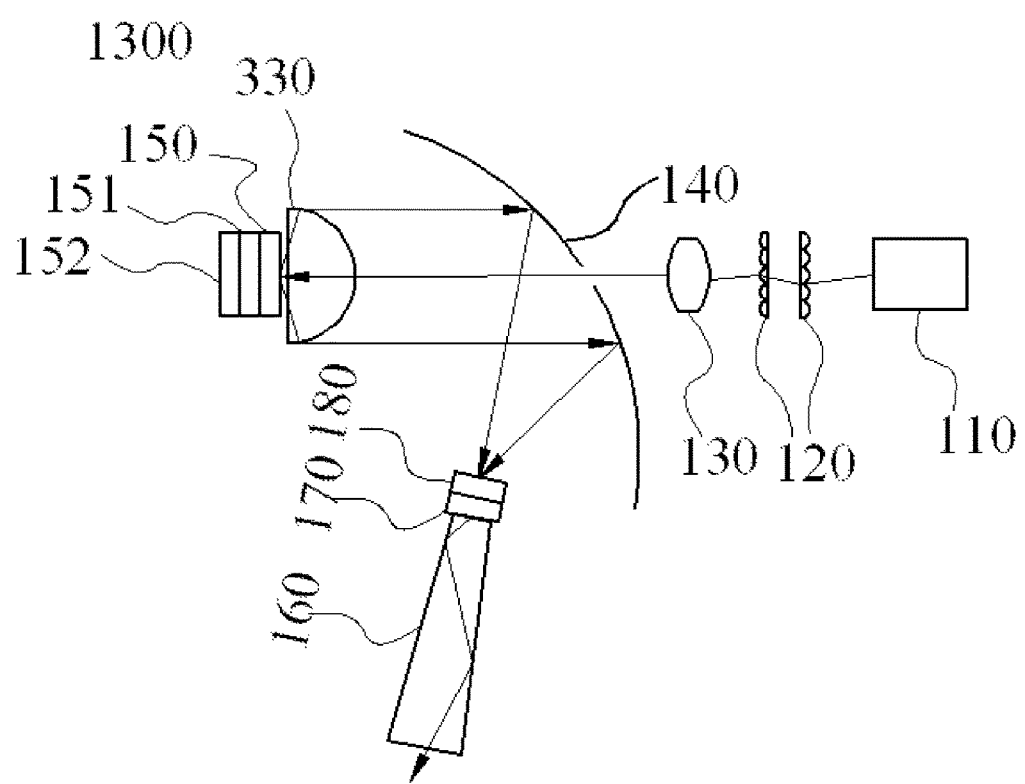
FIG. 13 illustrates a light source device according to another embodiment of the present invention, which is another variation of the embodiment of FIG. 4.

FIG. 13 illustrates another alternative of FIG. 4. Main differences between the embodiments shown in FIG. 13 and FIG. 4 include: The light source device 1300 in FIG. 13 includes a lens 330 to collect and collimate the converted light from the wavelength conversion material onto the reflector 140; the reflector 140 has a paraboloidal shape, which reflects the parallel light from the lens 330 to the entrance port of the light rod 160 disposed at the focal point of the reflector 140. Because the converted light from the wavelength conversion material has a near Lambertian distribution, it is more efficient to collect the converted light with the lens 330 first, as compared to directly reflecting the converted light from the wavelength conversion material by the reflector 140. It should be understood that when the requirement for light output efficiency is relatively low for some applications, the lens 330 can be omitted.

Figure 14:
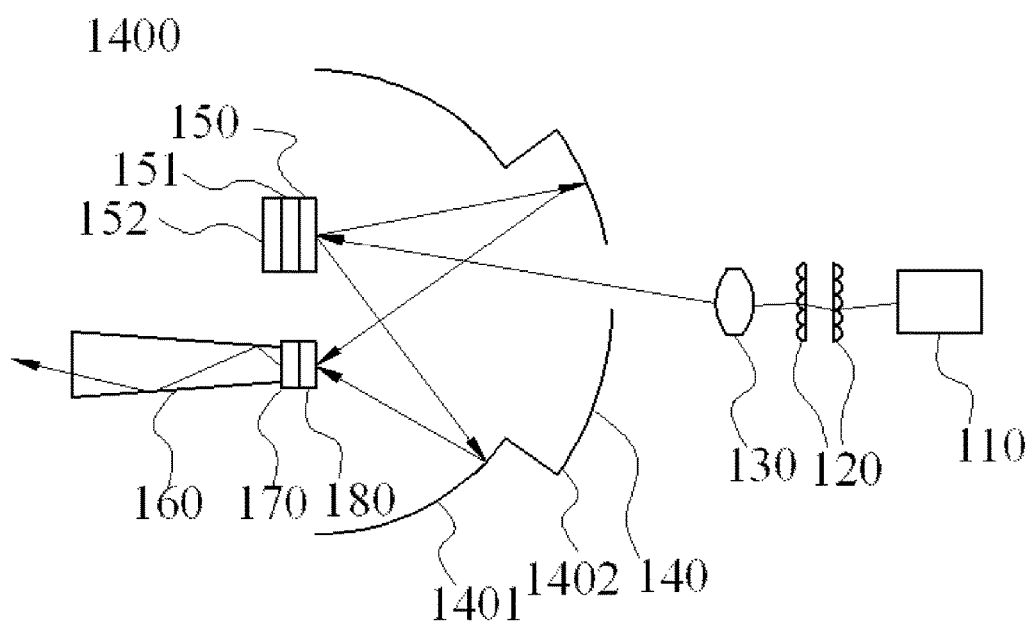
FIG. 14 illustrates a light source device according to another embodiment of the present invention, which is yet another variation of the embodiment of FIG. 4.

FIG. 14 illustrates another alternative of FIG. 4. Main differences between the embodiments shown in FIG. 14 and FIG. 4 include: The reflector 140 in the light source device 1400 shown in FIG. 14 is has a serrated shape, including two serrated surfaces 1401 and 1402, the serrated surfaces being a part of a set of concentric spheres. From the description of FIG. 4, is can be understood that serrated surfaces 1401 and 1402 both act as hemispherical reflectors; the serrated reflected can be understood to be a nested set of concentric hemispherical reflectors. It has the same reflecting effect for the converted light as the hemispherical reflector, but is more spatially compact than the hemispherical reflector. The serrated surface may also be a nested set of ellipsoidal surfaces having the same focal points, or a nested set of paraboloidal surfaces (refer to FIG. 13). Those skilled in the art can ascertain the optical properties of such reflectors and they will not be described in detail here.

Summarizing the various embodiments described above, the minimal structure of a light source device according to embodiments of the present invention includes: an excitation light source providing an excitation light; a wavelength conversion material located remotely from the excitation light source, for converting the excitation light into a converted light; a light transmission device for directing and separating the input optical path of the excitation light and the output optical path of the converted light, wherein to separate the optical paths of the excitation light and the converted light, an etendue of the light transmission device for guiding the excitation light is less than or equal to ¼ of an etendue of the light transmission device for guiding the converted light.

What is claimed is:

1. A wavelength conversion device comprising:
a circular substrate, including one or more first segments located in a first ring shaped region of the substrate and one or more second segments located in a second ring shaped region of the substrate, wherein the first ring shaped region and the second ring shaped region are non-overlapping when viewed in a direction perpendicular to the circular substrate;
a reflective material coated on each of the first segments;
one or more wavelength conversion materials, each being formed on one of the one or more first segments of the substrate over the reflective material, to form one or more wavelength conversion segments; and
one or more filter plates, each being affixed to one of the one or more second segments to form one or more filter segments, each of the one or more filter segments corresponding to one of the one or more wavelength conversion segments and being configured to filter a light emitted by the wavelength conversion material on the corresponding wavelength conversion segment to increase a color purity of the light, wherein each of the one or more filter segments and the corresponding wavelength conversion segment are non-overlapping when viewed in the direction perpendicular to the circular substrate, and wherein each of the one or more filter segments is free of any wavelength conversion materials.

2. The wavelength conversion device of claim 1, wherein the one or more wavelength conversion segments includes a first wavelength conversion segment having a red phosphor material formed thereon and a second wavelength conversion segment having a green phosphor material formed thereon, the substrate further comprising a third segment located in the first ring shaped region which is coated with the reflective material but has no wavelength conversion material formed thereon.

3. The wavelength conversion device of claim 2, wherein the one or more filter plates includes a red filter plate corresponding to the first wavelength conversion segment and configured to filter a red light generated by the red phosphor material of the first wavelength conversion segment to increase a color purity of the red light, a green filter plate corresponding to the second wavelength conversion segment and configured to filter a green light generated by the green phosphor material of the second wavelength conversion segment to increase a color purity of the green light, and either a blue filter plate or a plate coated on both sides with an antireflection coating corresponding to the third segment.

4. The wavelength conversion device of claim 3, wherein the red filter plate and the green filter plate are configured to reflect blue light.

5. The wavelength conversion device of claim 1, wherein the second ring shaped region is located outside of the first ring shaped region.

6. The wavelength conversion device of claim 1, further comprising a motor, wherein the filter segments and the wavelength conversion segments are assembled and driven by the motor to rotate together.

7. A wavelength conversion device, comprising:
a circular substrate, including one or more first segments located in a first ring shaped region of the substrate and one or more second segments located in a second ring shaped region of the substrate;
a reflective material coated on each of the first segments;
one or more wavelength conversion materials, each being formed on one of the one or more first segments of the substrate over the reflective material, to form one or more wavelength conversion segments, wherein each of the one more wavelength conversion segments additionally includes a scattering material mixed with the respective wavelength conversion material, and
one or more filter plates, each being affixed to one of the one or more second segments to form one or more filter segments, each of the one or more filter segments corresponding to one of the one or more wavelength conversion segments and being configured to filter a light emitted by the wavelength conversion material on the corresponding wavelength conversion segment to increase a color purity of the light.

8. The wavelength conversion device of claim 7, wherein the one or more wavelength conversion segments includes a first wavelength conversion segment having a red phosphor material formed thereon and a second wavelength conversion segment having a green phosphor material formed thereon, the substrate further comprising a third segment located in the first ring shaped region which is coated with the reflective material but has no wavelength conversion material formed thereon.

9. The wavelength conversion device of claim 7, wherein the one or more filter plates includes a red filter plate corresponding to the first wavelength conversion segment and configured to filter a red light generated by the red phosphor material of the first wavelength conversion segment to increase a color purity of the red light, a green filter plate corresponding to the second wavelength conversion segment and configured to filter a green light generated by the green phosphor material of the second wavelength conversion segment to increase a color purity of the green light, and either a blue filter plate or a plate coated on both sides with an antireflection coating corresponding to the third segment.

10. The wavelength conversion device of claim 9, wherein the red filter plate and the green filter plate are configured to reflect blue light.

11. The wavelength conversion device of claim 7, wherein the second ring shaped region is located outside of the first ring shaped region.

12. The wavelength conversion device of claim 7, further comprising a motor, wherein the filter segments and the wavelength conversion segments are assembled and driven by the motor to rotate together.

13. A light source device, comprising:
an excitation light source configured to generate an excitation light;
a wavelength conversion device located remotely from the excitation light source, the wavelength conversion device comprising:
  a circular substrate, including one or more first segments located in a first ring shaped region of the substrate and one or more second segments located in a second ring shaped region of the substrate;
  a reflective material coated on each of the first segments;
  one or more wavelength conversion materials, each being formed on one of the one or more first segments of the substrate over the reflective material, to form one or more wavelength conversion segments; and
  one or more filter plates, each being affixed to one of the one or more second segments to form one or more filter segments, each of the one or more filter segments corresponding to one of the wavelength conversion segments and being configured to filter a light emitted by the wavelength conversion material on the corresponding wavelength conversion segment to increase a color purity of the light;
a light introducing device for directing the excitation light onto the first ring shaped region of the wavelength conversion device; and
a light collecting device for collecting light from the first ring shaped region of the wavelength conversion device and guiding the collected light to the second ring shaped region of the wavelength conversion device.

14. The light source device of claim 13, wherein the excitation light source is configured to generate a blue excitation light, and
wherein in the wavelength conversion device, the one or more wavelength conversion segments includes a first wavelength conversion segment having a red phosphor material formed thereon and a second wavelength conversion segment having a green phosphor material formed thereon, the substrate further comprising a third segment located in the first ring shaped region which is coated with the reflective material but has no wavelength conversion material formed thereon.

15. The light source device of claim 14, wherein in the wavelength conversion device, the one or more filter plates includes a red filter plate corresponding to the first wavelength conversion segment and configured to filter a red light generated by the red phosphor material of the first wavelength conversion segment to increase a color purity of the red light, a green filter plate corresponding to the second wavelength conversion segment and configured to filter a green light generated by the green phosphor material of the second wavelength conversion segment to increase a color purity of the green light, and either a blue filter plate or a plate coated on both sides with an antireflection coating corresponding to the third segment.

16. The light source device of claim 15, wherein in the wavelength conversion device, the red filter plate and the green filter plate are configured to reflect the blue excitation light, and wherein the light collecting device reflects unabsorbed blue excitation light from the red or green phosphor material to the corresponding red or green filter plate, and further reflect the blue excitation light reflected by the red or green filter plate back to the red or green phosphor material.

17. The light source device of claim 13, wherein in the wavelength conversion device, each of the one more wavelength conversion segments additionally includes a scattering material mixed with the respective wavelength conversion material.

18. The light source device of claim 13, wherein in the wavelength conversion device, the second ring shaped region is located outside of the first ring shaped region.

19. The light source device of claim 13, further comprising a motor configured to drive the wavelength conversion device to rotate.

20. The light source device of claim 13, wherein an etendue of the light introducing device is less than or equal to ¼ of an etendue of the light collecting device.

* * * * *